Figure 2:
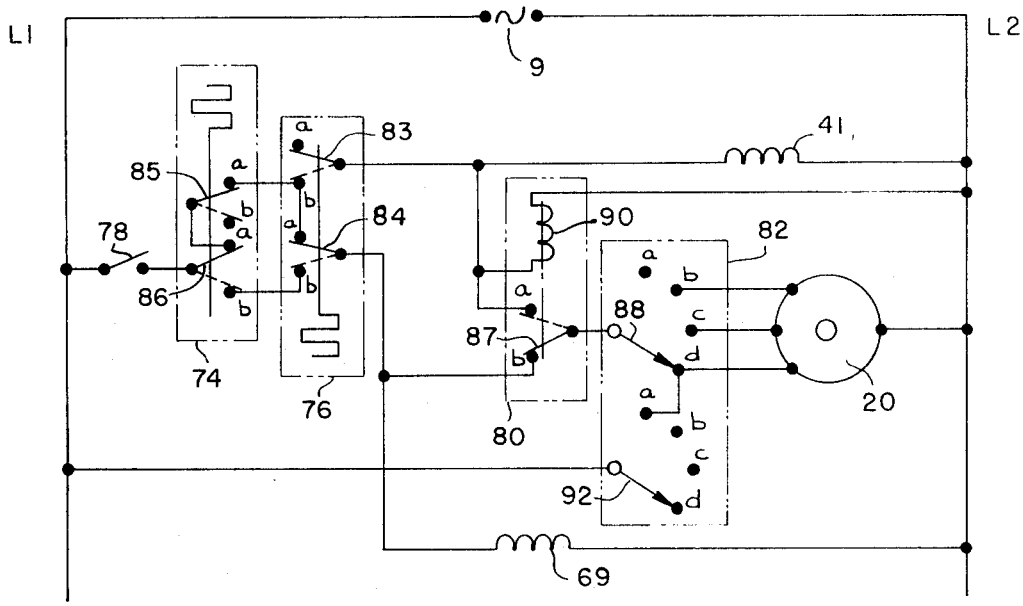

United States Patent

[11] 3,590,910

| | | |
|---|---|---|
| [72] | Inventor | John W. Lorenz |
| | | La Crosse, Wis. |
| [21] | Appl. No. | 311 |
| [22] | Filed | Jan. 2, 1970 |
| [45] | Patented | July 6, 1971 |
| [73] | Assignee | The Trane Company |
| | | La Crosse, Wis. |

[54] HEATING-COOLING AIR-CONDITIONING SYSTEM CONTROL
7 Claims, 2 Drawing Figs.

[52] U.S. Cl. .................................................. 165/22, 165/30; 48
[51] Int. Cl. .................................................. F24 3/00
[50] Field of Search ........................................... 165/16, 22, 26, 27, 28, 64, 30, 29, 48

[56] References Cited
UNITED STATES PATENTS
2,468,626  4/1949  Graham........................ 165/28

*Primary Examiner*—Charles Sukalo
*Attorneys*—Arthur O. Andersen and Carl M. Lewis ABSTRACT: A zone-type heating-cooling air-conditioning system is shown wherein each zone or unit is provided with a primary heat exchanger circuit and a secondary heat exchanger circuit. The primary heat exchanger is arranged to be supplied with warm water during the heating season and chilled water during the cooling season. The secondary heat exchanger is arranged to be supplied with domestic warm water. Each of the heat exchangers is provided with a control valve for controlling the circulation of heat exchange fluid therethrough. A fan is arranged to circulate air of the respective zone serially in heat exchange relationship with the primary heat exchanger and the secondary heat exchanger. A zone temperature control system responsive to the temperature of the respective zone and the temperature of the heat exchange fluid being supplied to the primary heat exchanger controls the operation of the valves and fan.

PATENTED JUL 6 1971 3,590,910

INVENTOR.
JOHN W. LORENZ
BY
Carl M. Lewis
ATTORNEY

HEATING-COOLING AIR-CONDITIONING SYSTEM CONTROL

The present invention relates to air-conditioning systems utilizing warm and chilled water for heating and cooling buildings, apartments, hotels, motels,, and etc. More particularly it relates to an air-conditioning system for a zone or space in which two heat exchangers are utilized to effect the heating function and one of the two eat exchangers is utilized to effect the cooling function. A thermostat controls the operation of each of the heat exchangers in response to the temperature of the conditioned space or zone. The action of the thermostat with respect to the primary heat exchanger, that is the heat exchanger performing both heating and cooling functions, is reversed in response to a change in the temperature of the functions, is reversed in response to a change in the temperature of the water being circulated to the primary heat exchanger from cool to warm and vice versa so that the same thermostat controls both the heating and cooling functions of the air-conditioning system.

In the instant invention the zone thermostat controls both the heat exchangers as well as the fan circulating air of the conditioned space in heat exchange relationship with the primary and secondary heat exchangers. In is manner the fan can be automatically operated only when either of the two heat exchangers is operating.

It is thus the object of this invention to provide an air-conditioning system employing a primary heating and cooling heat exchanger and an auxiliary or secondary heating heat exchanger with a control system for operating each of the heat exchangers and the heat exchanger fan automatically in response to the temperature of the conditioned space and the temperature of the heat exchange fluid supplied to the primary heat exchanger.

It is another object of this invention to provide the aforedescribed air-conditioning system with two distinct heat exchange fluid sources, one of which is the domestic hot water supply.

Figure 1:
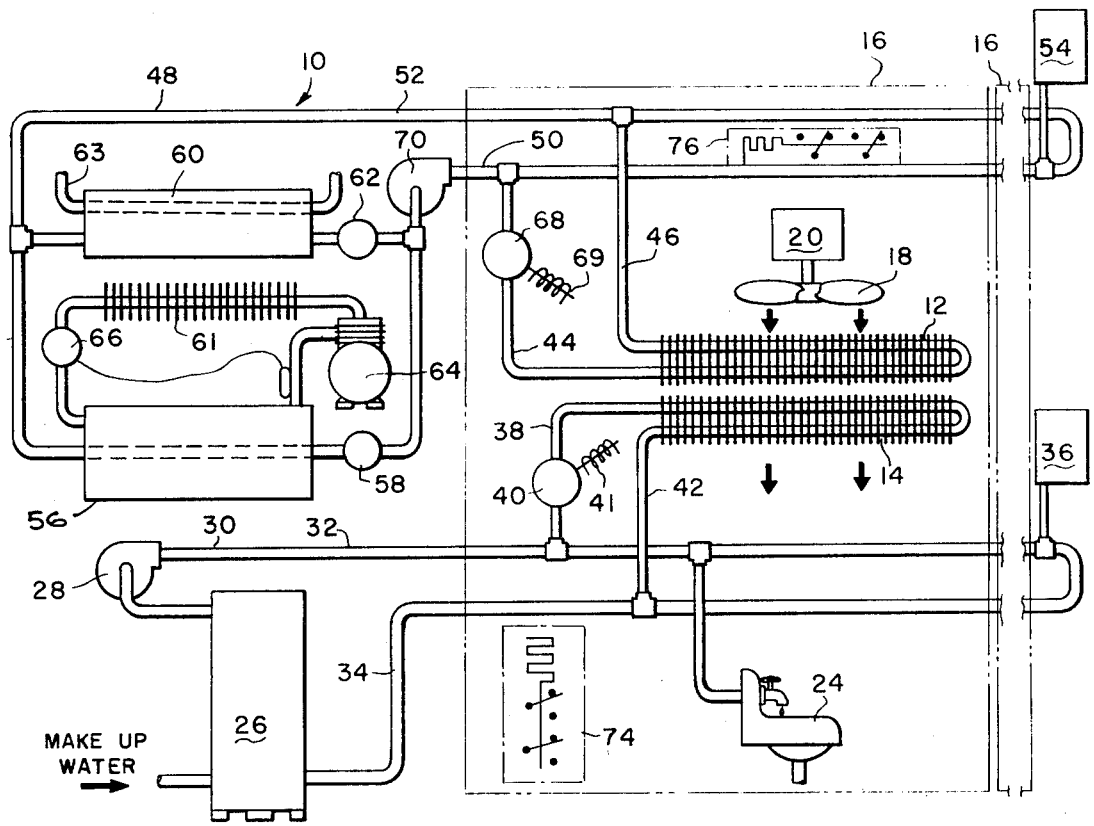

Other objects and advantages will become apparent as this specification proceeds to describe the invention with reference to the drawing in which:

FIG. 1 is a schematic of the air-conditioning system incorporating the instant invention; and FIG. 2 is an electrical control circuit for controlling that portion of the air-conditioning system of FIG. 1 directly associated with one zone thereof.

Now referring to FIG. 1 of the drawings it will be seen that the air-conditioning system 10 includes a primary heat exchanger 12 and a secondary heat exchanger disposed in heat exchange relationship with the conditioned space or zone 16. Each heat exchanger has tubes for conducting a heat exchange liquid therethrough. A fan 18 driven by a three-speed motor 20 is arranged to pass air serially over heat exchangers 12 and 14 as indicated whereby heat exchange is effected between the air of the conditioned space or zone 16 and the liquid passing within e tubes of heat exchangers 12 and 14.

A domestic hot water supply is provided for lavatory 24 and the like within the zone 16 and includes a hot water heater 26 and a pump 28 arranged in a closed domestic hot water loop or circuit 30 having a domestic hot water supply conduit 32 and a domestic hot water return conduit 34 which may serve plural zones 16. If desired hot water loop or circuit 30 may be provided with an appropriate expansion tank 36. A branch inlet conduit 38 connects the domestic hot water supply conduit 32 with the inlet of heat exchanger 14. A solenoid operated valve 40 is disposed within branch inlet conduit 38 to interrupt the supply of domestic hot water to heat exchanger 14. Valve 40 is opened by energization of the solenoid 41 thereof to permit heat exchange fluid from supply conduit 32 to flow in inlet conduit 38 to the inlet of heat exchanger 14. Water is returned from heat exchanger 14 through branch outlet conduit 42 which connects to domestic hot water return conduit 34.

Heat exchanger 12 is connected by way of a branch inlet conduit 44 and a branch outlet conduit 46 to a second closed loop or water circuit 48 which has a supply conduit 50 and a return conduit 52 which may be arranged to serve plural zones 16. An expansion tank 54 may be provided for loop 48 if desired.

Supply conduit 50 is connected to the outlet of water chiller 56 by way of valve 58 and to the outlet of water heater 60 by way of valve 62. The water within heater 60 may be heated by indirect heat exchange with steam or the like passing through conduit 63. Return conduit 52 connects to water heater 60 and water chiller 56 for returning water from the loop 48. A refrigeration system having a compressor 64 is arranged to discharge hot refrigerant gas to condenser 61 where it is cooled and condensed. The condensed refrigerant is throttled to a lower pressure via expansion valve 66 and conducted to water chiller 56 where it is evaporated by indirect heat exchange with the water within water chiller 56 thereby cooling the water within chiller 56. The thus evaporated refrigerant is returned to compressor 64 for another cycle.

A pump 70 in supply conduit 50 circulates the water from either water chiller 56 or water heater 60 through the heat exchange loop 48. Branch inlet conduit 44 has a solenoid operated valve 68 for interrupting the supply of heat exchange liquid from supply conduit 50 to the inlet of heat exchanger 12. Valve 68 is opened by energization of the solenoid 69 thereof to permit the exchange fluid from supply conduit 50 to flow to the inlet of heat exchanger 12 and be returned by branch outlet conduit 46 to return conduit 52.

A first double-pole double-throw two-stage thermostat 74 is arranged to sense the temperature within condition space or zone 16. A second double-pole double-throw thermostat 76 is arranged to sense the temperature of the water flowing within the supply conduit 50. With pump 70 operating warm water passes through loop 48 when valve 62 is opened and valve 58 is closed, and chilled water passes through loop 48 when valve 58 is opened and valve 62 is closed. In the system herein disclosed chilled water would be supplied loop 48 throughout the cooling season and intermediate seasons while warm water would be supplied loop 48 during the winter or heating season only. The operation of valves 62 and 58 can be made automatic if desired.

OPERATION

The operation of the air-conditioning system of FIG. 1 is best understood by reference to the electrical circuit shown in FIG. 2. In addition to thermostats 74 and 76 the electrical circuit includes a main switch 78, a single-pole double-throw relay 80, and a double-pole quadruple-throw rotary gang fan control switch 82. It will be assumed that pump 28 circulates warm water through loop 30 at all times. Assume that valve 62 is open and valve 58 is closed and that pump 70 is circulating warm water through loop 48 whereby switches 83 and 84 of water thermostat 76 take the position bridging contacts *a* as shown in FIG. 2. The system is ready for operation by closure of switch 78. Should the temperature within the conditioned space fall below a predetermined value, the switches 85 and 86 of thermostat 74 will move to the position shown in FIG. 2 in solid line whereby a first circuit is established between line 1 and line 2 of alternating current power source 9 including switch 78, switches 86 and 85 of thermostat 74, switch 84 of thermostat 76, switch 87 of relay 80, switch 88 of fan control 82, and fan motor 20. It will be appreciated that throws *b, c* and *d* of fan control 82 represent manually selected low, medium, and high speed connections to motor 20. Thus fan 20 will be operated at high-speed in the position shown for switch 88. Also a second circuit is established including main switch 78, switches 86 and 85 of thermostat 74, switch 84 of thermostat 76, and solenoid 69 of valve 68 whereby valve 68 is energized to the open position. Upon the opening of valve 68 warm water flows from supply conduit 50, through inlet conduit 44, through heat exchanger 12, and through outlet conduit 46 to return conduit 52 whereby warm water is circulated through heat exchanger 12 and the air passed over the heat exchanger 12 by fan 18 is warmed to raise the temperature of conditioned space 16. When the temperature in the conditioned space 16 rises above a predetermined value switch 85 of thermostat 74 moves to throw b as shown in dotted line position thereby interrupting the aforedescribed circuits, deenergizing fan 18 and valve 68. The closure of valve 68 interrupts the flow of warm heat exchange fluid through heat exchanger 12. Should the space 16 again become excessively cold the system will repeat the above-described cycle energizing fan 18 and valve 68 whereby the conditioned space 16 is warmed. At all times when warm water is being circulated in loop 48, no circuit is established through solenoid 41 to open valve 40 and set heat exchanger 14 in operation.

Now let it be assumed that valve 62 is closed, valve 58 open, pump 70 is operating and compressor 64 is operating to chill the water within water chiller 56. Thus chilled water is circulated through loop 48. In such event switches 83 and 84 of thermostats 76 assume the position shown in dotted line in FIG. 2. Let it also be assumed that switch 78 is closed to ready the system for operation. Should the temperature in the conditioned space rise above a predetermined value, switches 85 and 86 of thermostat 74 will bridge contacts b as shown in the dotted line position in FIG. 2. This establishes a circuit between line 1 and line 2 including main switch 78, switch 86 of thermostat 74, switch 84 of thermostat 76, switch 87 of relay 80, switch 88 of fan control 82, and fan motor 20 thereby energizing fan 18. A second circuit is also established including main switch 78, switch 86 of thermostat 74, switch 84 of thermostat 76, and solenoid 69 of valve 68 whereby valve 68 is moved to the open position. With valve 68 open chilled water passes from supply conduit 50, through branch inlet conduit 44 to heat exchanger 12, and from heat exchanger 12 through branch outlet conduit 46 to return conduit 52 whereby the air within the conditioned space 16 is cooled. When the cooling demand of space 16 is satisfied switch 86 of thermostat 74 will move to the solid line position thereby interrupting the aforedescribed circuits, thus deenergizing fan 18 and valve 68.

Should the temperature within space 16 continue to fall below a predetermined value, switch 85 of thermostat 74 will move to the solid line position thereby establishing a circuit including main switch 78, switches 86 and 85 of thermostat 74, switch 83 of thermostat 76, and solenoid 41 of solenoid valve 40 thereby opening valve 40 to allow domestic warm water to pass from supply conduit 32, through branch inlet conduit 38 to heat exchanger 14, and from heat exchanger 14 through branch outlet conduit 42 back to return conduit 34. Also a second circuit is established including main switch 78, switches 86 and 85 of thermostat 74, switch 83 of thermostat 76, and relay coil 90 of relay 80 thereby actuating switch 87 of relay 80 to the dotted line position. The movement of switch 87 to the dotted line position establishes a third circuit including main switch 78, switches 86 and 85 of thermostat 76, switch 83 of thermostat 76, switch 87 of relay 80, switch 88 of fan control 82, and motor 20 whereby fan 18 is energized. Space 16 is thus warmed by secondary or auxiliary heat exchanger 14.

Thus it will be seen that fan 18 is automatically energized only when either of heat exchangers 12 or 14 are conducting a heat exchange fluid. However, it should be noted that manual fan control 82 is provided with a pole a. By manually selecting pole a of fan control 82, a circuit is established between line 1 and line 2 including switch 92 of fan control 82 and fan motor 20 whereby fan 18 is operated continuously.

Having now described the preferred embodiment of my invention, I contemplate that many changes may be made without departing from the scope or spirit of my invention, and I accordingly desire to be limited only by the claims.

I claim:

1. Apparatus for air-conditioning a space comprising: a first heat exchanger adapted to conduct chilled and warm heat exchange liquid therethrough for cooling and heating said space; a second heat exchanger adapted to conduct warm heat exchange liquid therethrough for heating said space; a source of chilled heat exchange liquid for said first heat exchanger; a source of warm heat exchange liquid for said first heat exchanger; a source of warm heat exchange liquid for said second heat exchanger; first conduit means for conducting heat exchange liquid from said source of chilled heat exchange liquid and from said source of warm heat exchange liquid for said first heat exchanger to the inlet of said first heat exchanger; second conduit means for conducting warm heat exchange liquid from said source of warm heat exchange liquid for said second heat exchanger to the inlet of said second heat exchanger; first valve means for interrupting the flow of heat exchange liquid through said first heat exchanger; second valve means for interrupting the flow of heat exchange liquid through said second heat exchanger; fan means for passing air for the conditioned space in heat exchange relationship with said first and second heat exchangers; means for maintaining said first valve means open in response to a first condition of simultaneous demand for heating said space and the presence of warm heat exchange liquid in said first conduit means; means for maintaining said first valve means open and said second valve means closed in response to a second condition of simultaneous demand for cooling said space and the presence of chilled heat exchange liquid in said first conduit means; means for maintaining said second valve means open and said first valve means closed in response to a third condition of simultaneous demand for heating said space and the presence of chilled heat exchange liquid in said first conduit means; and fan control means for energizing said fan means in response to any of said first, second and third conditions and deenergizing said fan means in response to the absence of all of said first, second and third conditions.

2. The apparatus as defined by claim 1 wherein said source of warm heat exchange liquid for said first heat exchanger is separate from said source of warm heat exchange liquid for said second heat exchanger.

3. The apparatus as defined by claim 2 wherein said source of warm heat exchange liquid for said second heat exchanger is a source of domestic hot water.

4. The apparatus as defined by claim 1 including means for selecting the speed of said fan means.

5. The apparatus as defined by claim 1 including a first switch responsive to the temperature of the heat exchange fluid in said first conduit means; a second switch responsive to the temperature of said space; a relay switch for controlling said fan means; a relay coil for actuating said relay switch; and an electric circuit connecting said first switch, said second switch and said relay coil in series relationship.

6. The apparatus as defined by claim 1 wherein said fan means passes air serially through said first and second heat exchangers.

7. Apparatus for air-conditioning a space comprising: a first heat exchanger adapted to conduct chilled and warm heat exchange liquid therethrough for cooling and heating said space respectively; a second heat exchanger for heating said space; a source of chilled heat exchange liquid for said first heat exchanger; a source of warm heat exchange liquid for said first heat exchanger; a source of energy for said second heat exchanger; conduit means for conducting heat exchange liquid from said source of chilled heat exchange liquid and from said source of warm heat exchange liquid to the inlet of said first heat exchanger; means for conveying energy from said source of energy to said second heat exchanger; valve means for interrupting the flow of heat exchange liquid through said first heat exchanger; second means for interrupting the supply of energy to said second heat exchanger; fan means for passing air for the conditioned space in heat exchange relationship with said first and second heat exchangers; means for maintaining said valve means open in response to a first condition of simultaneous demand for heating said space and the presence of warm heat exchange liquid in said conduit means; means for maintaining said valve means open and said second means in its interrupting condition in response to a second condition of simultaneous demand for cooling said space and the presence of chilled heat exchange liquid in said conduit means; means for rendering said second means ineffective and said valve means closed in response to a third condition of simultaneous demand for heating said space and the presence of chilled heat exchange liquid in said conduit means; and fan control means for energizing said fan means in response to any of said first, second and third conditions and deenergizing said fan means in response to the absence of all of said first, second and third conditions.